United States Patent [19]

Swartzel et al.

[11] Patent Number: 5,159,564
[45] Date of Patent: * Oct. 27, 1992

[54] THERMAL MEMORY CELL AND THERMAL SYSTEM EVALUATION

[75] Inventors: Kenneth R. Swartzel; Sudalaimuthu G. Ganesan, both of Raleigh; Richard T. Kuehn, Cary; Raymond W. Hamaker, Raleigh, all of N.C.; Farid Sadeghi, Malden, Mass.

[73] Assignee: North Carolina State University, Raleigh, N.C.

[*] Notice: The portion of the term of this patent subsequent to Jun. 4, 2008 has been disclaimed.

[21] Appl. No.: 709,718

[22] Filed: Jun. 3, 1991

Related U.S. Application Data

[63] Continuation of Ser. No. 289,358, Dec. 22, 1988, Pat. No. 5,021,981.

[51] Int. Cl.$^5$ .................. G01K 5/00; G01K 11/00
[52] U.S. Cl. .................................... 364/557; 374/178
[58] Field of Search .............. 364/557, 578, 477, 550; 374/178

[56] References Cited

U.S. PATENT DOCUMENTS

| | | |
|---|---|---|
| 2,809,116 | 10/1957 | Laskowski . |
| 3,038,812 | 6/1962 | Berman et al. . |
| 3,102,425 | 9/1963 | Westman et al. . |
| 3,344,670 | 10/1967 | Olsen et al. . |
| 3,456,112 | 7/1969 | Webb . |
| 3,479,876 | 11/1969 | Kliewer . |
| 3,496,774 | 2/1970 | Preszler . |
| 3,543,582 | 12/1970 | Sessler . |
| 3,638,495 | 2/1972 | Sessler ............................ 374/103 |
| 3,759,104 | 9/1973 | Robinson ......................... 374/177 |
| 3,888,631 | 6/1975 | Stürzinger ....................... 422/56 |
| 3,965,741 | 6/1976 | Wachtell et al. ................ 374/102 |
| 3,977,945 | 8/1976 | Törnmarck ....................... 435/20 |
| 4,022,149 | 5/1977 | Berger ............................ 116/219 |
| 4,114,559 | 9/1978 | Rogen ............................. 116/216 |
| 4,177,620 | 12/1979 | Daly et al. ..................... 53/425 |
| 4,189,399 | 2/1980 | Patel ............................. 436/7 |

(List continued on next page.)

OTHER PUBLICATIONS

Investigation of Thermally Oxidised Silicon Surfaces Using Metal-Oxide-Semiconductor Structures, Grove, A. S. et al., Solid-State Electronics, vol. 8, pp. 145–163, 1964.
Stabilization of $SiO_2$ Passivation Layers with $P_2O_5$, Kerr, D. R. et al., IBM Journal, pp. 376–384, Sep., 1964.
Ion Transport Phenomena in Insulating Films, Snow, E. H. et al., Journal of Applied Physics, vol. 36, No. 5, pp. 1664–1673, May, 1965.
Sodium Distribution in Thermal Oxide on Silicon by Radiochemical and MOS Analysis, Yon, E. et al., IEEE Transactions on Electron Devices, vol. Ed-13, No. 12, pp. 276–280, Feb., 1966.
Temperature Indicators, Temperature Integrators, Temperature Function Integrators and The Food Spoilage Chain, Olley, J., pp. 125–132.

(List continued on next page.)

Primary Examiner—Parshotam S. Lall
Assistant Examiner—S. A. Melnick
Attorney, Agent, or Firm—Bell, Seltzer, Park & Gibson

[57] ABSTRACT

A method for determining the thermal history of an object is disclosed. The object carries at least two thermal calibration materials having different activation energies. The method comprises: first, exposing an object to a thermal treatment; second, detecting the change in each of the calibration materials caused by the thermal treatment; and third, determining the thermal history of the thermal treatment from the detected changes.

Also disclosed are thermal history recording devices comprising one or more metal insulator semiconductor (MIS) capacitors. The insulating layer is non-uniformly doped with mobile charged carriers. Two or more MIS capacitors, each having different activation energies, may be mounted in a common support structure to provide a thermal memory cell. The thermal cells may be used in conjunction with an apparatus for determining the thermal history of the cells as also dislcosed herein.

25 Claims, 8 Drawing Sheets

U.S. PATENT DOCUMENTS

| | | | |
|---|---|---|---|
| 4,195,056 | 3/1980 | Patel | 422/56 |
| 4,195,058 | 3/1980 | Patel | 422/56 |
| 4,208,186 | 6/1980 | Patel | 436/2 |
| 4,215,208 | 7/1980 | Yee et al. | 526/285 |
| 4,228,126 | 10/1980 | Patel et al. | 422/56 |
| 4,238,352 | 12/1980 | Patel | 526/285 |
| 4,276,190 | 6/1981 | Patel | 250/408.1 |
| 4,277,974 | 7/1981 | Karr et al. | 374/102 |
| 4,278,561 | 7/1981 | Yee | 436/2 |
| 4,298,348 | 11/1981 | Ivory | 436/7 |
| 4,328,259 | 5/1982 | Patel et al. | 427/44 |
| 4,339,240 | 7/1982 | Patel | 436/171 |
| 4,373,032 | 2/1983 | Preziosi et al. | 521/38 |
| 4,382,700 | 5/1983 | Youngren | 374/102 |
| 4,384,980 | 5/1983 | Patel | 436/58 |
| 4,388,332 | 6/1983 | Egee et al. | 426/88 |
| 4,432,656 | 2/1984 | Allmendinger | 374/102 |
| 4,439,346 | 3/1984 | Patel et al. | 252/408.1 |
| 4,452,995 | 6/1984 | Patel | 560/166 |
| 4,469,452 | 9/1984 | Sharpless et al. | 374/160 |
| 4,533,898 | 8/1985 | Sauermann | 338/25 |
| 4,546,373 | 10/1985 | Todd et al. | 357/67 |
| 4,591,566 | 5/1986 | Smith | 435/291 |
| 4,629,330 | 12/1986 | Nichols | 368/89 |
| 4,636,093 | 1/1987 | Nagasaka et al. | 374/186 |
| 4,646,674 | 3/1987 | Preziosi et al. | 116/216 |
| 4,735,745 | 4/1988 | Preziosi et al. | 252/408.1 |
| 4,737,463 | 4/1988 | Bhattacharjee et al. | 436/2 |
| 4,744,672 | 5/1988 | Tursky et al. | 374/178 |
| 4,982,347 | 1/1991 | Rackerby et al. | 364/557 |
| 5,021,981 | 6/1991 | Swartzel et al. | 364/557 |

OTHER PUBLICATIONS

TL Series Non-Reversible Temperature Indicators, Omega Catalog, pp. Q3–Q14.

Time-Temperature Indicating System "Writes Status" of Product Shelf Life, Hu, K. H., Food Technology, pp. 56–62, Aug., 1972.

Defrost Indicators, Schoen, H. M. et al., Food Technology, pp. 46–50, Oct., 1972.

Temperature Indicators–The State of the Art, Byrne, C. H., Food Technology, pp. 66–68, Jun., 1976.

Testing of Time-Temperature Indicating and Defrost Devices, Kramer, A. et al., Food Technology, pp. 50–56, Feb., 1976.

Identification of Alkali Metal Ions in Silicon Dioxide Films, Antyushin, V. F. et al., Physica Status Solid (a) 56, pp. K91–K95, 1979.

Arrhenius Kinetics as Applied to Product Constituent Losses in Ultra High Temperature Processing, Swartzel, K. R., Journal of Food Science, vol. 47, 1982.

Auger sputter Profiling and Secondary Ion Mass Spectrometry Sudies of $SiO_2$ Grown in $O_2$/HCl Mixtures, Rouse, J. W. et al., J. Electrochem. Soc.: Solid-State Science and Technology, vol. 131, No. 4, pp. 887–894, Apr., 1984.

Continuous Flow Apparatus For Kinetic Studies, Swartzel, K. R. et al., Summer Meeting American Society of Agricultural Engineers, Paper No. 84–6006, Jun., 1984.

Diffusivity of Implanted Chlorine Atoms in Thermal Oxides on Silicon, Vengurlekar, A. S. et al., J. Electrochem. Soc.: Solid-State Science and Technology, vol. 132, No. 5, pp. 1172–1177, May, 1985.

System Design and Calibration of a Continuous Flow Apparatus for Kinetic Studies, Swartzel, K. R. et al., Journal of Food Science, vol. 50, pp. 1203–1207, 1985.

Micro-Computer Program for Determining the Unique Time-Temperature Associated With the Equivalent Point Method of Thermal Evaluation[1], Sadeghi, F. et al., pp. 331–335, 1986.

Calibration Materials for Thermal Systems, Sadeghi, F. et al., Paper No. 423, Jun., 1986.

Mobile Ions in $SiO_2$ Layers on Si, Hillen, M. W. et al., Instabilities in Silicon Devices: Silicon Passivation and Related Instabilities, Barbottin, G. et al., Chap. 8, pp. 403–439, 1986.

Sze, S. M. "Semiconductor Devices, Physics and Technology" ©1985 pp. 186–187, 197–200, 471–472.

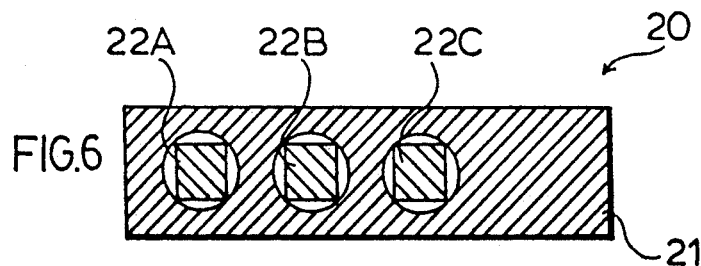
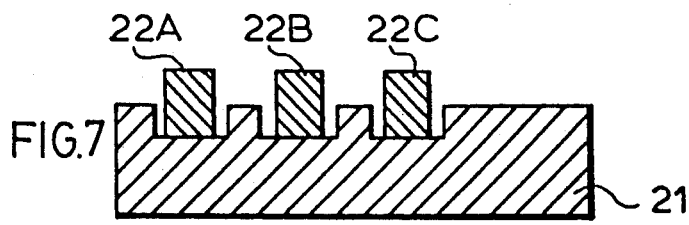
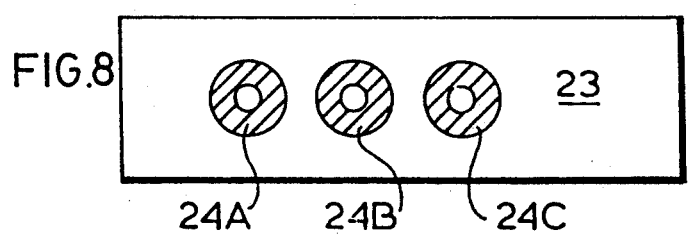
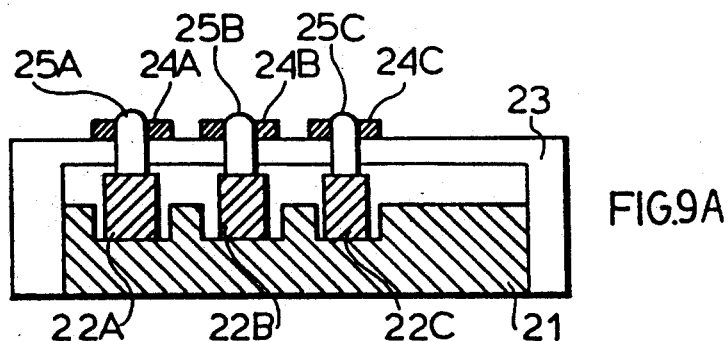
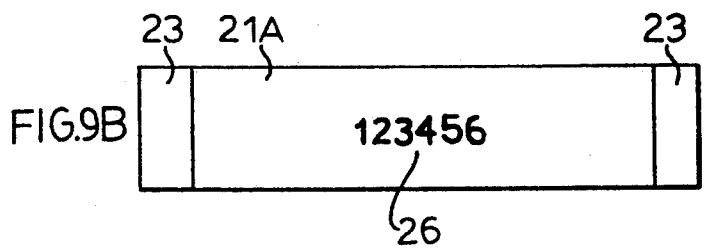
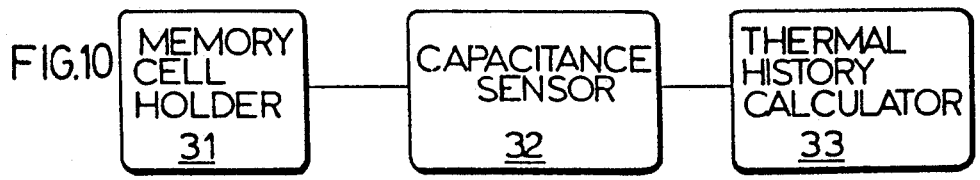

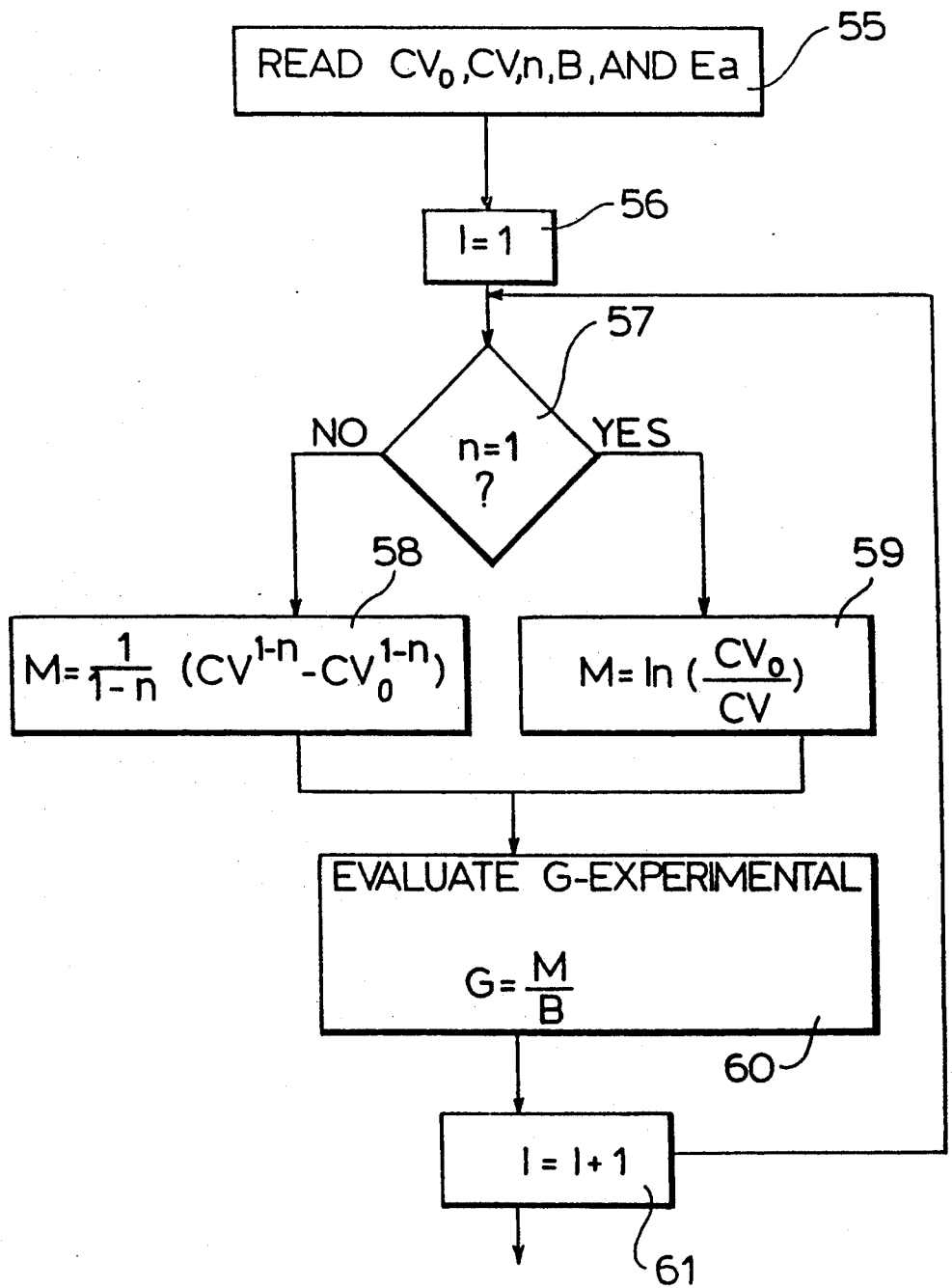

THERMAL MEMORY CELL AND THERMAL SYSTEM EVALUATION

This application is a continuation of application Ser. No. 07/289,358 filed Dec. 22, 1988, now U.S. Pat. No. 5,021,981.

BACKGROUND OF THE INVENTION

Thermal processes are used for a broad variety of purposes in the food, chemical, pharmaceutical, and paper and pulp industries. In the food processing industry, such processes include the cooking of canned products such as soup and the pasteurization of dairy products such as milk and eggs. At present, more than seventy thousand thermal processing lines approved by the Food and Drug Administration exist. Because of product changes, five to ten thousand processing lines must be evaluated each year. This procedure is time consuming, expensive, and often inaccurate.

In many industries, it is desirable to know the thermal history of particulates suspended in a liquid as they travel through a thermal processing apparatus. Due to the complex nature of these systems, however, true thermal histories cannot be obtained.

Procedures for use of the Equivalent Point Method (EPM) for analyzing the thermal effects on products during continuous flow heating have been disclosed. See K. Swartzel, 47 J. Food Sci. 1886 (1982); K. Swartzel, 34 J. Agric. Food Chem. 397 (1986). The Equivalent Point Method differs substantially from previous methods in that all other methods define the thermal treatment based upon a single factor such as enzyme inactivation, microbial destruction, protein denaturation, nutrient loss, etc. The problem with these other methods is that a physical and/or chemical effect (flavor, color, product separation and gelation during storage if thermally related) may actually be the shelf life limiting factor.

Calibration materials useful in the equivalent point method are discussed in F. Sadeghi and K. Swartzel, Calibration Materials for Thermal Systems (Institute of Food Technologists 46th Annual Meeting Food Expo, Jun. 15-18, 1986) (tape available from Institute of Food Technologists). Candidate calibration materials mentioned are esters, ketones, peroxides, sugars, vitamins, enzymes and dyes.

Solid-state radiation detectors have been suggested for temperature recording. Such devices are made of a silicon substrate with a layer of lithium diffused into its surface. T. Hirsch, Whither microengineering, Chemtech 118, 121 (February 1986), suggests measuring surface capacitance or resistance in such devices to determine the degree of temperature-dependent lithium migration. G. Haugen and G. Hieftje, An Interdisciplinary Approach to Microinstrumentation, 60 Analytical Chemistry 23A, 27A (1988), suggest that, if several combinations of semiconductor and dopant are used that possess a range of activation energies in such a device, the combination of readouts corresponds to a set of integral equations that can be inverted mathematically (inverse LaPlace transform) to produce the full curve of time versus temperature.

The disadvantages of existing technology for thermal system evaluation pose severe problems for the Food Processing Industry. There is presently a critical need to accurately characterize thermal behavior within a food particle as it is pumped through a continuous flow thermal processing apparatus. The present invention is based on our continued research in this area.

SUMMARY OF THE INVENTION

According to the invention, a new class of thermal history recording devices comprising one or more metal insulator semiconductor (MIS) capacitors are provided. The insulating layer is non-uniformly doped with mobile charged carriers. At least two MIS capacitors, doped with materials having different activation energies, are exposed to a thermal treatment process, and the change in capacitance in the objects may be employed to calculate the thermal history of the devices. Two or more MIS capacitors, each having different activation energies, may be mounted in a common support structure to provide a thermal memory cell, which in turn may be embedded in an object (e.g., a food particle) which then undergoes thermal treatment. The thermal cells are extremely small, easy and inexpensive to fabricate using well known semiconductor fabrication techniques, and provide an accurate and repeatable integration of the thermal history.

The thermal cells of the present invention may be used in conjunction with an apparatus for determining the thermal history of the cells. The apparatus includes a holder for the cell, a capacitance sensor for detecting changes in the capacitance of each of the MIS capacitors in the cell, and a stored program computer for calculating the thermal history from the detected changes in capacitance.

According to the invention, the computer may be programmed to efficiently calculate the thermal history of any object which carries two or more thermal calibration materials having different activation energies, be they MIS capacitors or otherwise. The equivalent point of a thermal treatment may be calculated by determining the product constituent relationship for each calibration material, interpolating to obtain a range of product constituent relationships versus activation energy and obtaining the equivalent point by applying, for example, a weighted least squares linear regression to the range of product constituent relationships versus activation energy. A complete time-temperature profile may be obtained from the product constituent relationships for each calibration material by performing a numerical integration of its product constituent relationships. A complete characterization of any thermal process may be obtained.

BRIEF DESCRIPTION OF THE DRAWINGS

FIG. 6 is a top plan view of a thermal memory cell of the present invention with the cover removed;

FIG. 7 is a cross-sectional view of the thermal memory cell shown in FIG. 6;

FIG. 8 is a top plan view of a thermal memory cell of the present invention with the cover in place;

FIG. 9A and 9B are a cross-sectional view and a bottom view, respectively of the thermal memory cell shown in FIG. 8;

FIG. 10 is a schematic wiring diagram of an apparatus according to the present invention;

FIGS. 12A–12C are simplified flowcharts illustrating the details of certain operations of FIG. 11.

DETAILED DESCRIPTION OF THE PREFERRED EMBODIMENTS

Figure 1:
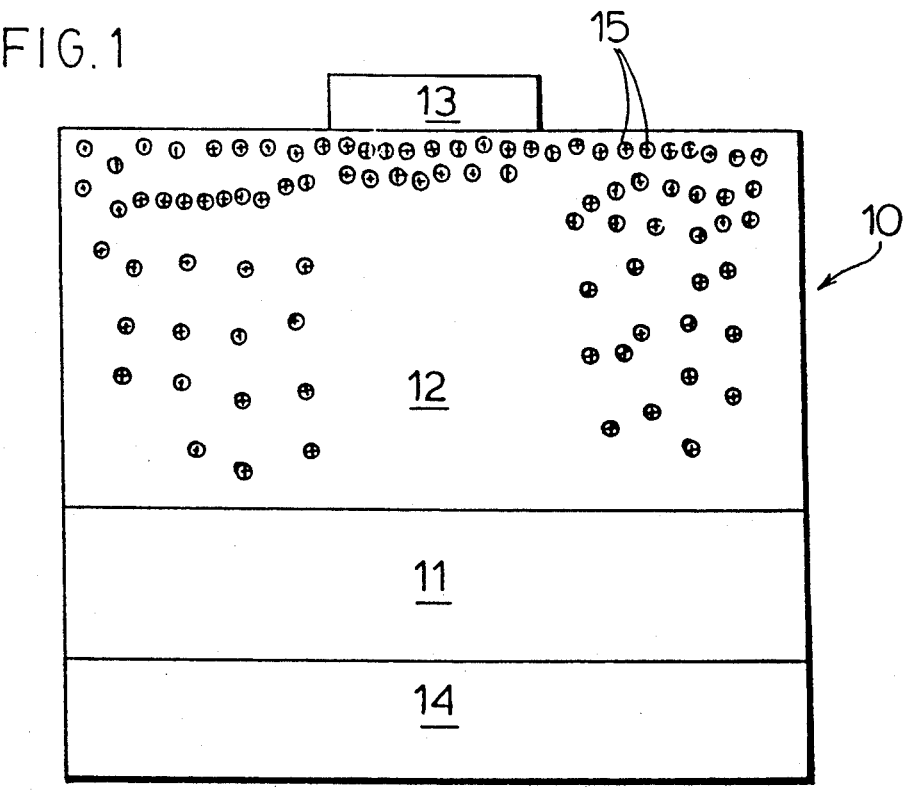
FIG. 1 is a cross-sectional view of a MIS capacitor after initial thermal/bias stress, with the field oxide present.
Figure 2:
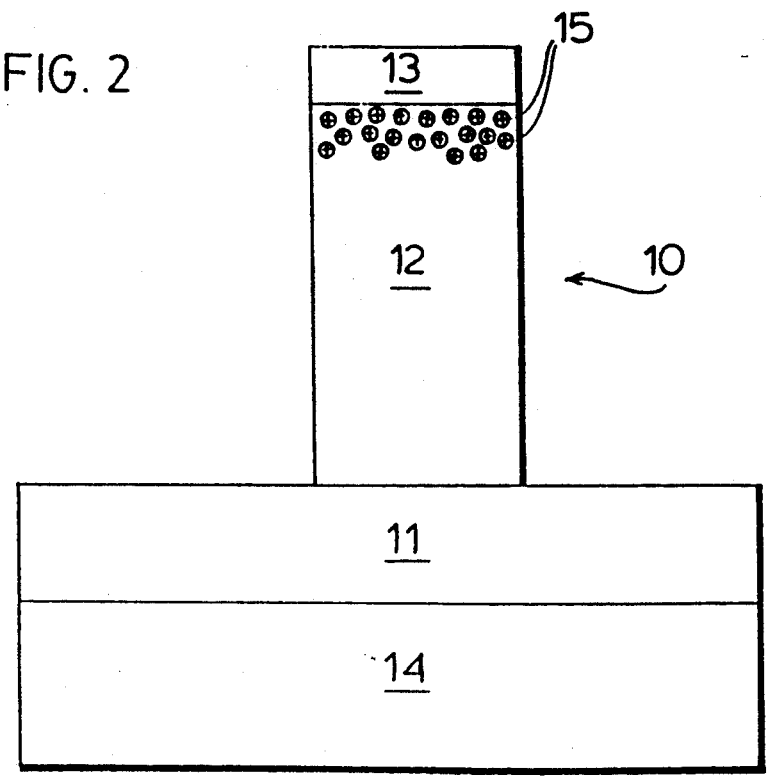
FIG. 2 is a cross-sectional view of a MIS capacitor after initial thermal/bias stress, with the field oxide removed.

A single MIS capacitor 10, as prepared for use in the present invention, is shown in FIGS. 1 and 2. The capacitor comprises a semiconductor substrate 11, for example, silicon, germanium or gallium arsenide, an insulating layer 12, for example, silicon dioxide or aluminum oxide, formed on the Si substrate, and a conductive layer 13 (preferably aluminum), formed on the insulating layer. A second conductive layer 14 (preferably aluminum) is formed under substrate 11. In a preferred embodiment, substrate 11 is monocrystalline silicon, insulating layer 12 is a grown silicon dioxide layer 1000 Å thick, while metal electrodes 13 and 14 are typically aluminum electrodes 4000–5000 Å thick. The insulating layer 12 is non-uniformly doped with a charged ion 15, with the charged ion preferably being lithium, potassium or sodium. However, it will be understood by those having skill in the art that any charged ion which is mobile in insulating layer 12 at the expected processing temperatures may be employed. Preferably, the portion of insulator 12 which lies outside top conductor 13 is removed, as shown in FIG. 2, so that insulator 12 and the metal layer 13 are coextensive.

The theory of MIS capacitors is known in the literature and has been summarized in a detailed paper by Grove, A. et al., *Solid-State Electron.* 8, 145 (1965). Depending upon whether the metal electrode is biased positively or negatively for a given semiconductor type (p or n type), the resultant semiconductor interface boundary layer is either accumulated (conductive) or depleted (dielectric). In the latter case, the depletion layer becomes a capacitor in series with that of the insulator. This results in a total capacitance less than the smaller of either of the two components as determined from the product of the two divided by the sum of the two capacitances.

Introduction of mobile ionized impurities (dopants) such as the alkali metals $Na^+$, $K^+$ and $Li^+$ into the insulating layer of the MIS structure has been shown to produce time-dependent shifts in the normal capacitance-voltage characteristic of the device at elevated temperatures [see Kerr, D., *IBM Journal* 8, 376 (1964); Snow, E. et al., *J. Appl. Phys.* 36, 1664 (1965); Yon, E. et al., *IEEE Trans. Electron Devices* ED-13, 276 (1966); Antyushin, V. et al., *Physica Status Solidi (a)* 56, K91 (1979); Yamashita, K. et al., *J. Appl. Phys.* 20, 1429 (1981); and Hillen, M. and Verwey, J., 1 *Instabilities in Silicon Devices*, Chap. 8 (G. Barbottin and A. Vapaille, eds., North Holland Book Co., Amsterdam, 1986)]. The presence of such mobile ions is normally undesirable in semiconductor device structures since it can produce anomalous device surface leakage paths that are deleterious to device operation [see Grove, A., *Physics and Technology of Semiconductor Devices*, Chap. 12 (John Wiley and Sons, New York, 1967), and Sze, S., *Physics of Semiconductor Devices*, Chap. 10 (Wiley-Interscience Publ. Co., New York, 1969)].

According to the invention, when controlled amounts of certain mobile ion impurities are non-uniformly introduced into the insulator of a MIS capacitor, the diffusion kinetics of the mobile ions can be studied by measuring the resultant characteristic MIS device capacitance-voltage shifts with time at specific temperatures. If the mobile ions are initially attracted to either the metal-insulator or semiconductor-insulator interfaces by a rapid elevated temperature stress under the appropriate bias, the resultant diffusion kinetics at elevated temperatures produce predictable capacitance-voltage (C-V) shifts. According to the invention, such C-V shifts can then be utilized to determine both temperature and time-at-temperature for a particular elevated temperature event.

The MIS capacitor structures of the present invention may be fabricated using conventional microelectronic fabrication techniques. For example, the MIS capacitor may be fabricated in a semiconductor clean room environment from either high resistivity (preferably greater than 5 ohm cm) n or p-type (100) oriented single crystal Si wafers 11.

Initially, wafers are cleaned by a three-step process to remove organic and inorganic contaminants as well as native oxide surface films. This cleaning process was developed by RCA Corp. (see W. Kern, Semiconductor International, April (1984), p. 94) and insures a microscopically clean surface prior to device fabrication.

After surface cleaning, wafers 11 are placed in a conventional oxidation tube furnace and thin silicon dioxide films 12, preferably 1000 Å thick, are grown by a dry ($O_2$)/wet ($H_2O+HCl$)/dry ($O_2$) process at 900°–1050° C.

The next step is oxide doping with an aqueous solution of a hydroxide of the desired mobile ion impurity 15. Each wafer is placed on a photoresist spinner and the solution applied while the wafer is spinning at about 2000 rpm. This insures uniformity of film thickness and provides a means of controlling the concentration of the impurity in the oxide film. Alternate means are by solution dipping or ion implantation. The concentration of hydroxide in the water solutions is dependent on the particular mobile ion required in the oxide film for optimal device performance.

After deposition of the doping solution on device wafer surfaces, the wafers are then baked on a hot plate at 250° C. for one hour to insure adequate impurity diffusion (drive-in) into the thin oxide films. While 250° C. is the preferred temperature for the impurities used herein, different temperature ranges may be appropriate for other impurities. From the literature limited diffusivity of the hydroxyl (OH) anion is evident in silicon dioxide films (E. Yon et al., IEEE Trans. on Electron Devices ED-13, 276 (1966)); hence, unpredictable anion effects upon mobile cation diffusion in oxide films are minimized. In contrast, the use of halide salt solutions as diffusion sources have been shown to produce considerable anion concentrations in bulk oxide films (E. Yon et al., ibid). Such anion-doped oxide films have been predicted by the above authors to retard the rate of diffusion of the mobile cation.

Next, thin aluminum films 13 (4000–5000 Å) are vapor deposited on the front sides of the wafers in a high vacuum evaporator system. The front side of the wafers are then coated with a 1.5 micron thick layer of positive photoresist, and the wafers hard baked for thirty minutes at 120°-130° C. in an oven. The wafers are then dipped in a buffered oxide etch solution (ten parts NH$_4$F solution to one part 49% HF solution) to remove back side oxide deposited during the original thermal oxide growth step. Afterward, photoresist films are stripped from the front sides of the wafers with ACCU-STRIP TM (Allied Chemical Co.); then thin films of aluminum 14 (2000 Å or more) are deposited on the back sides of the wafers. The wafers are then sintered in 9N$_2$/1H$_2$ forming gas for thirty minutes at 400° C. in a tubular diffusion furnace.

To create appropriate surface electrode patterns, the front sides of the wafers are then recoated with photoresist and the wafers soft baked on a hot plate for five to ten minutes at 95° C. The wafers are then aligned, exposed, and developed using an appropriate mask. Next, the wafers are hard baked for thirty minutes at 120°-130° C., aluminum etched with twelve parts phosphoric acid/two parts acetic acid/three parts nitric acid solution, and rinsed with deionized water. The photoresist is then removed from the wafers with ACCUS-TRIP TM and the wafers rinsed with deionized water.

Finally, the portion of field oxide 12 lying outside electrode 13 is removed with a dry etch/liquid etch procedure to avoid lateral etch of the oxide. The wafers are placed in a Reactive Ion Etch chamber, a $10^{-5}$ Torr or better vacuum drawn, CHF$_3$ gas introduced at $50 \times 10^{-3}$ Torr, then the wafers are reactive ion etched at 200 watts for up to five minutes. After dry etching, the wafers are etched with buffered oxide etch solution for thirty seconds to remove surface oxide, and rinsed with deionized water.

In the alternative, after sintering, wafers are mounted on a vacuum or mechanical chuck and chip dicing performed. For this operation, either a high speed circular dicing saw or a laser cutting tool is used to cut chip die with the desired tolerance on chip dimensions. For the proposed application, 1 mm $\times$ 1 mm square die are selected for final device packaging. This saves the steps of photomasking and dry and wet etch.

After MIS capacitor construction is completed, each wafer is secured to a vacuum chuck and a measuring probe contacted to the capacitor. A capacitance-voltage (C-V) scan is performed with the voltage limits at $\pm 5$ volts. The mobile ions are then drawn to the metal/oxide or Si/oxide interface by applying an appropriate bias voltage (positive for n-type and negative for p-type) to the aluminum pad 13 and heating the "thermal/bias stress". For p-type wafers, $-6$ volts at 200° C. for ten minutes may be used.

Figure 3:
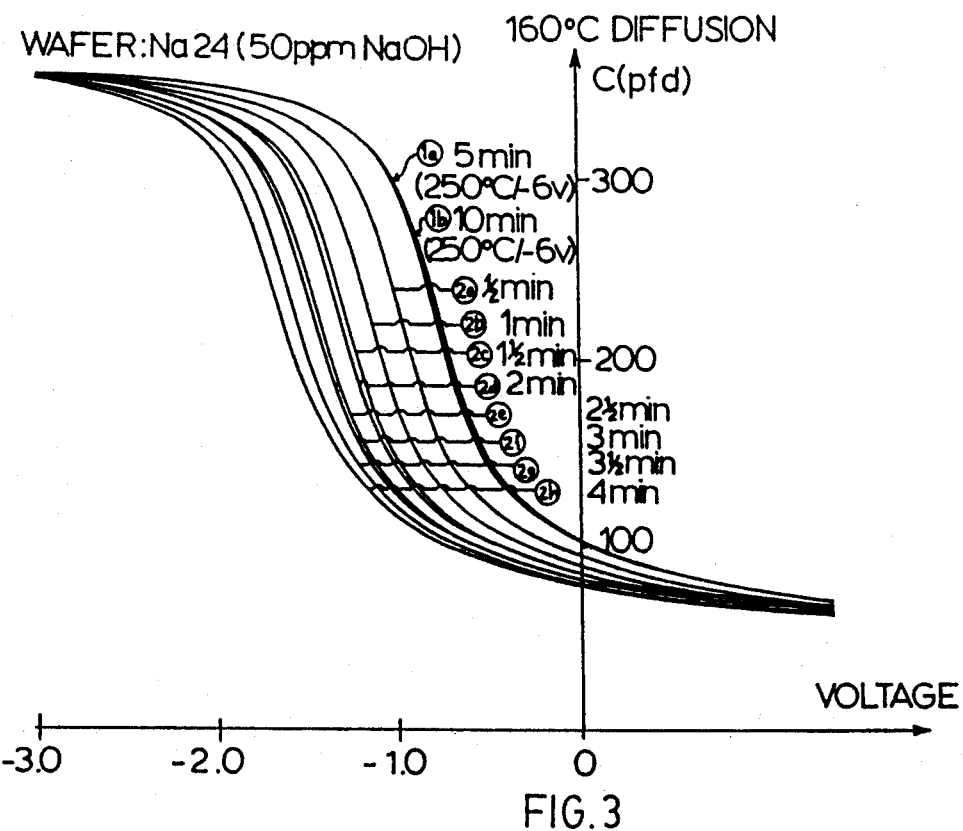
FIG. 3 is a plot of capacitance against voltage shift for a MIS capacitor as shown in FIG. 1 after different thermal treatments.

FIG. 3 shows the C-V scan for an MIS capacitor as shown in FIG. 1, prepared as described above except that the field oxide outside electrode 13 is not removed. The two rightmost lines represent C-V scans after initial thermal/bias stress (1$a$ for five minutes; 1$b$ for ten minutes). The remaining lines 2$a$-2$h$ represent C-V plots taken at half minute intervals during a 160° C. thermal treatment. Note the variability between intervals.

Figure 4:
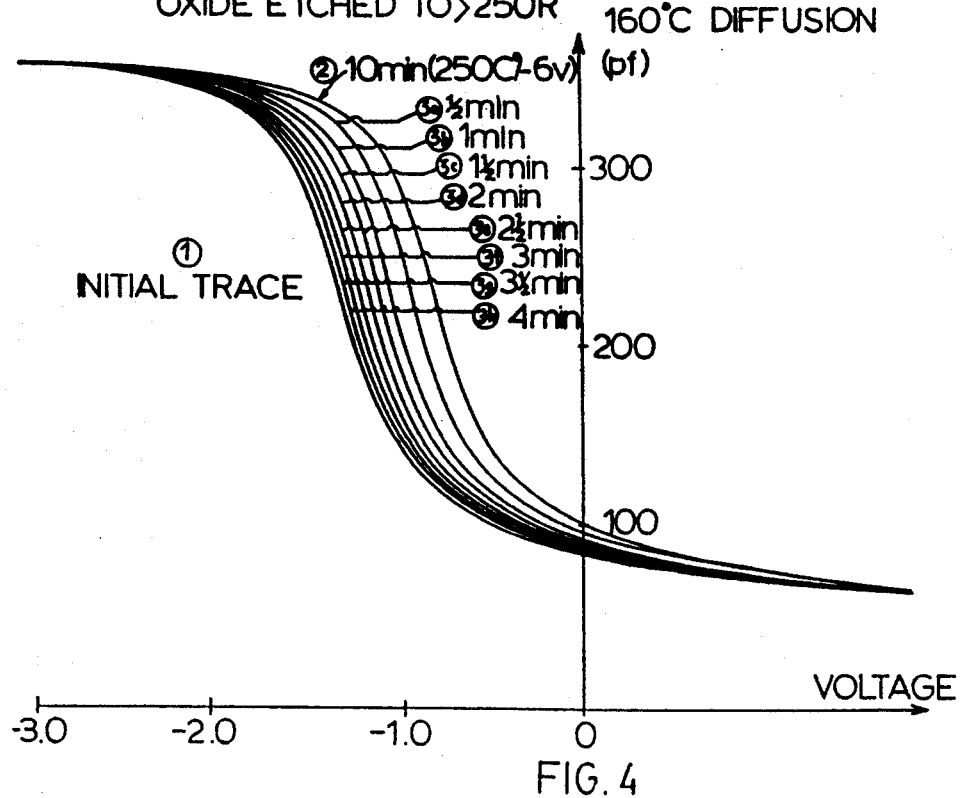
FIG. 4 is a plot of capacitance against voltage shift for a MIS capacitor as shown in FIG. 2 after different thermal treatments.

FIG. 4 is a series of C-V traces like FIG. 3, taken from the same MIS capacitor used to generate FIG. 3 except that field oxide lying outside electrode 13 has been substantially removed. Rightmost line 2 represents the C-V scan after initial thermal/bias stress. The remaining lines 3$a$-3$h$ represent C-V plots taken at half minute intervals during a 160° C. thermal treatment. Note the uniformity between intervals achieved through substantial removal of the field oxide.

For many thermal memory cell applications, the change in device capacitance with time at a fixed temperature is a much more convenient parameter to measure than is a C-V shift characteristic (FIG. 4). If one applies a fixed bias to a MIS capacitor at a potential in the nearly linear region of the dynamic C-V characteristic, then a predictable time dependent change in device capacitance is evident. This is best illustrated by selecting a bias of $-1.0$ volts to the p-type device in FIG. 4 and noting the resultant change in the intercept value of a vertical line drawn from the $-1.0$ volt point (on the abscissa) to the family of C-V shift curves.

Figure 5:
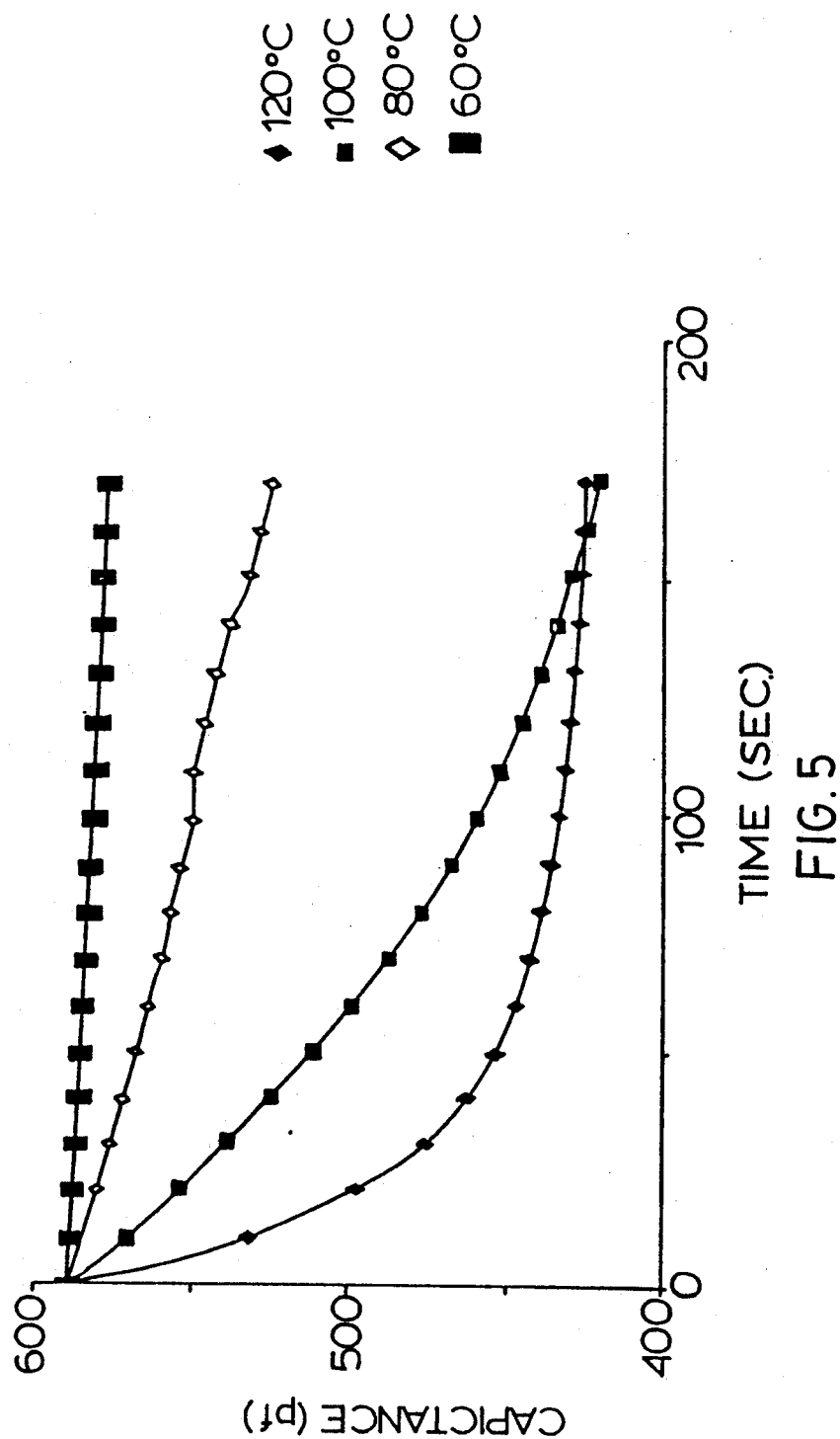
FIG. 5 is a plot of capacitance over time at various temperatures for a device as shown in FIG. 2.

An example of the dynamic capacitance characteristic of a p-type MIS capacitor with a 1000 Å oxide doped with 200 ppm of Na is shown in FIG. 5. Time-at-temperature capacitance characteristics are shown at 20° C. intervals between 60° C. and 120° C. for a bias of $-0.9$ volt. Such well behaved capacitance changes with time provides a graded response which permits calculation of equivalent points, time-temperature profiles, and residence times for a thermal treatment, with the algorithms described below. The graded response provided according to the present invention is in contrast with prior art temperature sensors which provide an indicator as to whether a predetermined temperature has been reached, but cannot provide information regarding equivalent points or thermal profiles. Stated another way, the well behaved capacitance changes provide an integrator of the time/temperature profile. Time-temperature integrators having different activation energies may be provided, according to the present invention, to determine the thermal history of a thermal treatment.

A Thermal Memory Cell incorporating the MIS capacitors described above is shown in FIGS. 6-9. The cell 20 is comprised of a copper base 21, three MIS capacitor chips 22A-22C, a molded epoxy resin cover 23, and three copper lands 24A-24C on the top of the cover. The copper carrier 21 is configured as a rectangle for ease of insertion into solid particles, though other configurations would also be suitable. In one embodiment, one capacitor 22A is doped with sodium, one capacitor 22B is doped with potassium, and one capacitor 22C is doped with lithium, to provide capacitors with three different activation energies. Alternatively, different activation energies may be provided by doping all the capacitors with sodium, and providing varying levels of positive ions in combination with the sodium. It has been found that different activation energies for sodium or other positive ions may be provided by doping with negative ions such as Cl$^-$ or Br$^-$. Thus, in another embodiment, one capacitor 22A is doped with Na$^-$ alone, another capacitor 22B is doped with Na$^+$ and Cl$^-$ and a third capacitor 22C with Na$^+$ and Br$^-$.

Each capacitor chip 22 is positioned in a well formed in the base 21 to align the chip, and the chips 22 are soldered to the base 21 with aluminum saturated tin solder. AMCO 64 soldering flux (a product of the American Solder & Flux Co., Inc.) may be employed for all soldered connections in the thermal memory cell. The copper lands 24 are etched in place on the epoxy resin cover 23 in the same manner as copper on a printed circuit board. A hole penetrates through the center of each copper land and through the cover. When the epoxy-resin cover is placed over the copper base, each hole is filled with solder 25A-25C so that each capacitor is electrically connected with the copper land positioned thereabove. If desired, the joint between the copper base 21 and the resin cover 23 can be sealed with epoxy resin. A serial number 26 or other indicia can be stamped on the bottom surface 21A of the copper carrier 21 so that Thermal Memory Cells in a set of such cells can be distinguished from one another.

A simplified block diagram of an apparatus for determining the thermal history of a thermal process according to the present invention is illustrated in FIG. 10. The apparatus 30 is comprised of, in combination, a thermal memory cell holder 31, a capacitance sensor 32, and a thermal history calculator 33. The holder 31 may be a vacuum chuck for securing the base of the thermal memory cell 20 (FIGS. 6-9) and for making electrical contact to the base 21 thereof, and an electrode mounted on a micromanipulator for making electrical contact to the lands 24 of the cell. The mechanical design of such a holder is well known to those having skill in the art, and will be dependent upon the shape and size of the thermal memory cell 20. The capacitance sensor 32 may be electrically connected to the cell through the chuck and electrode. Any conventional capacitance sensor, such as a capacitance bridge, may be employed. The thermal history calculator 33 is operatively associated with the capacitance sensor. In a preferred embodiment, a stored program microcomputer connected to capacitance sensor 32 can be used.

Figure 11:
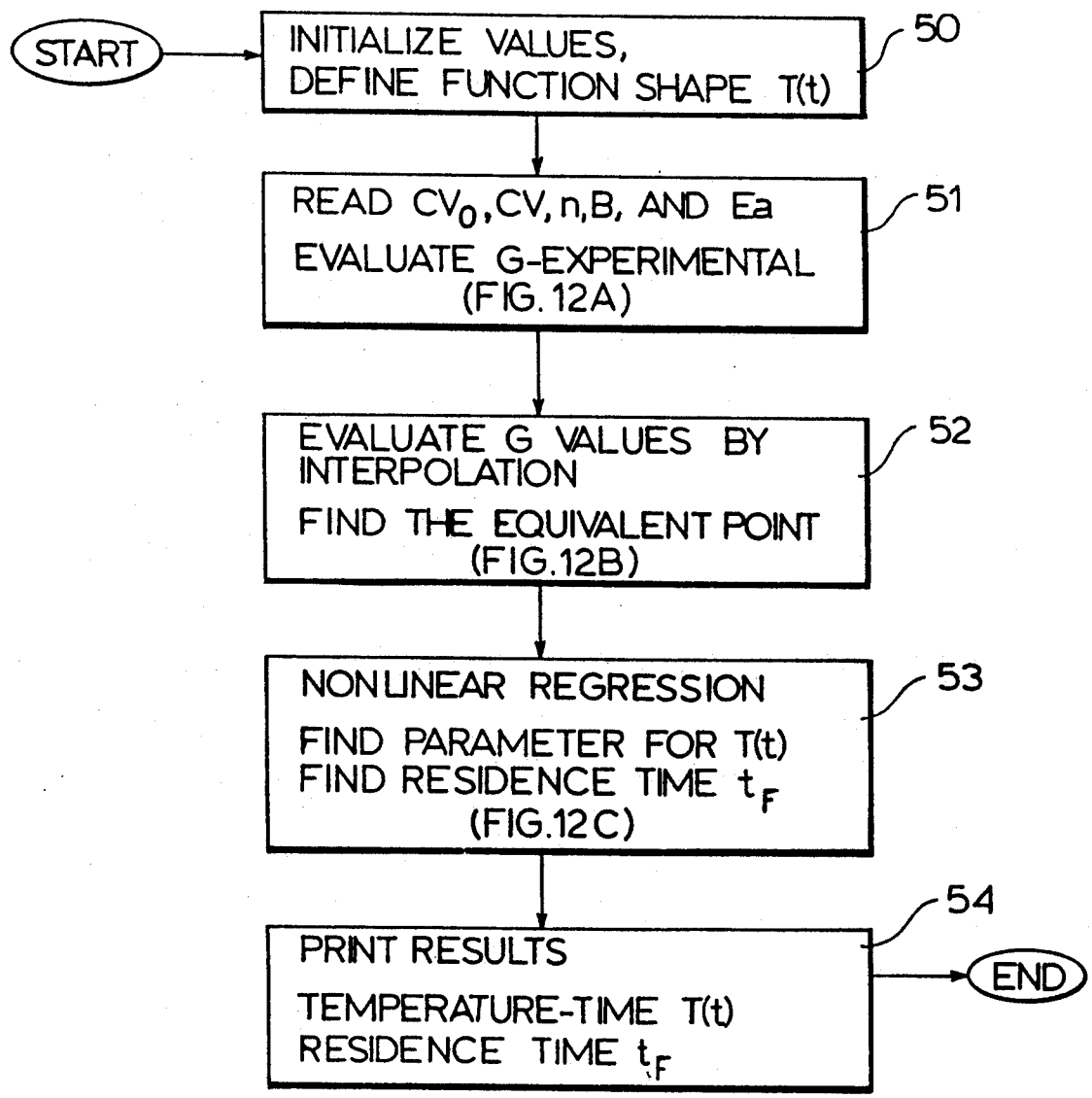
FIG. 11 is a simplified flowchart illustrating certain operations for computing equivalent times and temperatures and time-temperature profiles according to the present invention.

FIG. 11 illustrates the calculation of equivalent time and temperature and time-temperature profile in the apparatus of FIG. 10. In a preferred embodiment, the flowchart of FIG. 11 may be embodied in a stored program which runs on microcomputer 33. This program may be designed according to techniques well known to those having skill in the art, based upon the flowcharts of FIGS. 11 and 12, and the following description.

Thermal systems are defined by way of product properties, system properties, and the effect of one on the other. The starting point for all thermal system descriptors is the temperature and time exposure. Many contact point source temperature methods exist including thermal sensors relating some calibrated change associated with the sensor to a data retrieval system by way of wire connections. Other contact sensors use different contacting modes for data retrieval, i.e., electromagnetic waves (visible, infrared, radio waves, etc.). Noncontact methods (using memory cells) have only recently become commercially available with limited application due to the current state of the technology. With the development of the Equivalent Point Method (EPM) of thermal evaluation, numerous new methods for determining product and system responses to heat are now available.

The key concept behind the Equivalent Point Method (EPM) is that any system, however complex, can be thermally characterized by two parameters, namely the Equivalent temperature, $T_E$, and the Equivalent time, $t_E$. These two parameters uniquely define the system and hence can be used to compare the changes undergone by different constituents when subject to the same thermal treatment. For example, two chemical constituents with different kinetic properties will undergo different extents of thermal degradation when subject to the same thermal environment. However, both constituents will possess the same equivalent time, $t_E$, and temperature, $T_E$. The Equivalent Point Method ($t_E$, $T_E$) is hence a property of the system and is independent of the kinetic parameters (Order, n; Activation Energy, E; preexponential factor, B; etc.) of the individual constituents.

Other time-temperature indicators available commercially match the activation energy of the indicator with the desired constituent and assume that the change in the indicator corresponds to the change in the constituent. Suppose the kinetics of an indicator were given by the general equation $$M_I = B_I \int_0^t e^{-E_I/RT} dt \tag{1}$$

where $E_I$ is the activation energy of the indicator, $B_I$ is the Arrhenius preexponential factor, and $M_I$ is the relative change in property of indicator (concentration, color, nutrient loss, etc.)

In the indicator that follows first order kinetics, then $$M_I = Ln(C_{IO}/C_{If}) \tag{2}$$

where $C_{If}$ is the final concentration of indicator, and $C_{IO}$ is the initial concentration of indicator.

The kinetics of a constituent can be given by $$M_C = B_C \int_0^t e^{-E_C/RT} dt \tag{3}$$

where $B_c$ is the Arrhenius preexponential factor, $E_c$ is the activation energy of the constituent, and $M_C$ is the relative change in property of the constituent.

If the constituent also follows first order reaction kinetics, then $$M_C = Ln(C_{CO}/C_{CF}) \tag{4}$$

where $C_{Cf}$ is the final concentration of constituent, and $C_{CO}$ is the initial concentration of constituent.

It can be seen from equations (1) and (3) that if the activation energy of the indicator $E_I$ is matched to equal the activation energy of the constituent, $E_C$, then the expressions inside the integral in both equations would be equal. However, unless the preexponential factor of the indicator ($B_I$) is also equal to that of the constituent ($B_C$), the relative change in property of the indicator ($M_I$), would not be the same as that of the constituent ($M_C$).

In addition, the kinetics of the constituent must follow the same order of reaction as the indicator (in this example both were assumed to be first order) for the comparisons to be valid.

Hence, it is seen that merely matching the activation energies of the indicator and constituent is not sufficient and will lead to erroneous conclusions regarding the final concentration predicted for the constituent ($C_F$). The Equivalent Point Method (EPM) as described in detail below, matches the equivalences of the system rather than the activation energies or other properties of the individual constituents, and is thus not prone to the same errors as the other available methods.

The Equivalent Point Method (EPM) of thermal evaluation was originally developed for use with first order reactions to compare direct and indirect aseptic heating systems, Swartzel, K., *J. Food Sci.* 47, 186 (1982). It was later extended to include reactions which were not first order, Swartzel, K. and Jones, V., 1984. At present, however, only one procedure (Line Intersections method) has been described in the literature to determine both $t_E$ and $T_E$, see Sadeghi, F. et al., *J. Food Proc. and Pres.* 10, 331 (1986), and Swartzel, K., *J. Food Sci.* 47, 186 (1982). According to the invention, a new method for calculating the equivalent point is described.

A critical step in determining both $t_E$ and $T_E$ for a known time-temperature distribution, T(t), is the integration of the Arrhenius equation. This integration for different activation energies result in the thermal reduction relationship, G-value, see Swartzel, K., *J. Food Sci.* 47, 186 (1982) and Swartzel, K., *J. Food Sci.* 49, 803 (1984). Integration of the rate law equation with substitution of the Arrhenius model for the rate constant yields an absolute G-value:

$$G_{Abs} = \frac{M}{B} = \int_0^{t_f} \exp\left(-\frac{Ea}{RT(t)}\right) dt \quad (5)$$

where Ea is the activation energy (J/mol), R is the Universal Gas Constant (8.314 J/mol K), $t_f$ is the final processing time (s), B is the Arrhenius preexponential constant, and M is defined as:

$$M = \text{Ln}\left(\frac{C_0}{C_0 - X}\right) \text{ (first order reactions)} \quad (6)$$

$$M = \frac{1}{n-1}[(C_0 - X)^{1-n} - C_0^{1-n}] \text{ (for n-th order reactions)} \quad (7)$$

where $C_0$ is the initial concentration and X is the extent of reaction. Numerical values for $G_{Abs}$ yields dramatic changes with different values of Ea. Computational problems often appear due to a limiting argument for the exponential function; that is, most microcomputers have a limit of −96.9, setting a restriction for Ea, i.e., Ea ≦ 300 kJ/mole, see Sadeghi, F. et al., *J. Food Proc. and Pres.* 10, 331 (1986). To avoid these problems a new definition is introduced by using a reference temperature:

$$G = \int_0^t \exp\left[\left(-\frac{Ea}{R}\right)\left(\frac{1}{T(t)} - \frac{1}{T_{Ref}}\right)\right] dt \quad (8)$$

As is common practice in thermal processes, it is convenient to set $T_{Ref} = 121.1°$ C. Thus, by introducing the proper time-temperature distribution, equation (8) is valid for any kind of heating process with the following relationship between the two G-values:

$$G_{Abs} = \frac{M}{B} = \exp\left(-\frac{Ea}{RT_{Ref}}\right) \cdot G \quad (9)$$

Usually, thermal treatments are divided into three sections: heating, holding, and cooling. Before parameter estimation, the contribution of the different thermal sections has to be evaluated. Therefore, for a selected Ea-value, a G-value is calculated for each portion of the thermal curve. G-values for the different portions are summed because thermal effects are additive. For any particular value of Ea, equation (8) yields:

$$G^{Total} = G^{Heat} + G^{Hold} + G^{Cool} \quad (10)$$

The equivalent time ($t_E$) and equivalent temperature ($T_E$) are obtained from the following model:

$$G = t_E \exp\left[-\frac{Ea}{R}\left(\frac{1}{T_E} - \frac{1}{T_{Ref}}\right)\right] \quad (11)$$

The following three methods for estimating the equivalent point can be used:

1. Line Intersections (LI)

This method has been reported in the literature. See Swartzel, K., *J. Food Sci.* 47, 186 (1982); Swartzel, K., *J. Food Sci.* 49, 803 (1984); and Sadeghi, F. et al., *J. Food Proc. and Pres.* 10, 331 (1986).

2. Nonlinear Least Squares Repression (NLSR)

The nonlinear regression performs a single regression which allows for both $t_E$ and $T_E$ directly by using equation 11. A Gauss-Marquardt nonlinear regression routine was used, see Press, W. et al., *Numerical Recipes: The Art of Scientific Computing* (Cambridge University Press, New York, 1986).

3. Weighted Least Squares Regression (WLSR)

For cases where the variance is not constant throughout the range of measured values. The method of weighted least squares allows for excellent parameter estimation. In addition, parameter estimation involving exponents requires weighted least squares, as shown by Norris, A., *Computational Chemistry an Introduction to Numerical Methods* (J. Wiley & Sons, New York, 1981). The function to be minimized is:

$$\phi = \sum_{i=1}^{n} (G^{Total})(i)^2 \cdot [\text{Ln}(G^{Total}(i)) - a - bEa(i)]^2 \quad (12)$$

Both WLSR and NLSR provide outstanding predictions for $t_E$ and $T_E$ with the same level of accuracy. Based upon its simplicity and performance, WLSR is considered best for parameter evaluation to determine the equivalent point ($t_E$, $T_E$).

Using the EPM a variety of memory cell designs allows the determination of the following thermal information:

(a) Actual time-temperature history of a point source within a thermal system, including dynamic systems.

(b) The residence time of the point in a dynamic system.

(c) The residence time distribution (RTD) of particles moving in a fluid in a dynamic thermal system.

(d) The film side heat transfer coefficient as a particle—fluid boundary in a dynamic thermal system.

(e) Constituent kinetics in micro-environments at point sources in dynamic systems.

(f) Thermodynamic and transport properties of materials such as specific heat capacity, thermal conductivity, thermal diffusivity, enthalpy, entropy, internal energy, etc., in dynamic systems.

(g) Fouling dynamics of heat exchangers.

In a typical thermal system consisting of particles moving in a carrier fluid, the latter also serves as the heating medium for the particles. Assuming that the physical properties of the particle such as specific heat capacity, thermal conductivity, size, and density are known, the functional form of the time-temperature profile of the center of the particle can be determined. The equations describing the shape of the time-temperature profile are readily available in most heat transfer textbooks. The parameters that describe the exact curve are now known a priori, however, and must be determined.

The residence time of a particle in a dynamic system must be known before any predictions can be made regarding the effects of thermal treatment on it. However, this is a very difficult task and, at present, no reliable methods are available that can determine the particle residence time.

The Equivalent Point Method (EPM) allows for evaluating the exact time-temperature profile of the particle center, and the residence time of a particle in a dynamic system.

The physical properties of the particle and system such as specific heat capacity, density, thermal conductivity, particle size, its initial temperature, and the temperature of the bulk fluid are assumed to be known. Also, from the physics of the system, the shape of the time-temperature profile is known. Since the exact curve is not known, the shape is expressed as in terms of several unknown parameters P1, P2, . . . , Pn. These parameters will be determined later and the exact time-temperature profile known (see FIG. 11, block 50).

The method of the present invention uses two or more calibration materials to determine the Equivalent Point ($T_E$, $t_E$) of the system. Use of calibration materials to determine ($T_E$, $t_E$) of the system are discussed in Sadeghi, F. and Swartzel, K., Calibration Materials for Thermal Systems (Institute of Food Technologists 46th Annual Meeting Food Expo., Jun. 15-18, 1986). In that work calibration materials were used to determine the Equivalent Point of bulk fluid continuous flow systems. In the present case, calibration materials may consist of different mobile ions, such as sodium, potassium, or lithium, each used as a dopant within a thin Metal Insulator Semiconductor (MIS) insulator layer. As discussed earlier in the detailed description of the MIS capacitor, the device is small enough to be inserted into the center of the particle undergoing thermal treatment, yielding a point source Equivalent Point available for other system thermal determinations.

The present method uses the diffusion kinetics of the mobile ion within the oxide layer, the extent of diffusion being dependent on the time-temperature exposure. This extent is determined by measuring the Capacitance Voltage (C-V) shift taking place. The MIS capacitor is initialized by moving the mobile ions within the oxide to either the metal-oxide or the silicon-oxide interface by elevated temperature stress under a positive or negative bias. The initial C-V scan is designated $(CV)_0$. After the device is subject to a thermal treatment, another C-V scan is done to measure the extent of this shift. This is designated $(CV)_f$. In addition, information relating to the order n, preexponential factor B, and the activation energy $E_a$ are also known a priori and recorded. (See FIG. 11, block 51 and FIG. 12A, block 55).

Figure 12B:
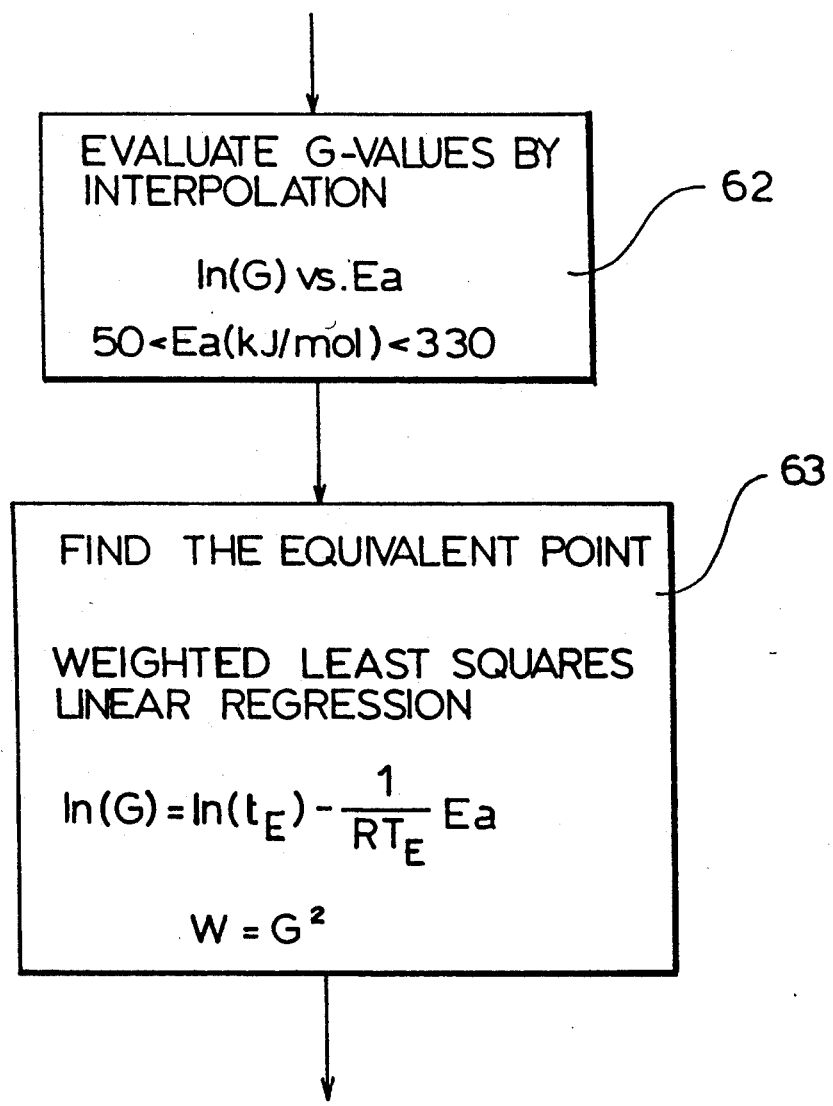

Referring now to FIG. 12A, if the diffusion is first order (n=1) (block 57), then the relative change in C-V shift M is given by $$M_1 = Ln((VC)_0/(CV)_f) \quad (13)$$

(block 59) where B is the preexponential factor, E is the activation energy, $t_f$ is the final time or residence time of particle, and $t_E$ and $T_E$ are the equivalent time and temperature for the particle center.

For any other order (n not equal to 1) the relative shift is given by $$M = 1/(1-n)[(CV)_f^{1-n} - (CV)_0^{1-n}] \quad (14)$$

(block 58). Once M is known, the product constituent relationship G can be computed as $$G = M/B \quad (15)$$

(block 60). The steps are then repeated for each of the calibration materials (block 61).

Evaluation of G Values and Equivalent Point

Referring again to FIG. 11, by knowing the activation energy $E_a$ and the corresponding G values of the three materials, a plot of G versus $E_a$ can be drawn. By interpolation, a table of G versus $E_I$ values can be prepared (block 52). Usually it is more convenient to plot Ln (G) versus $E_a$, to obtain the equivalent point. (See FIG. 10b, block 62). The values of activation energy $E_a$ are usually in the range 50 to 330 KJ/mol. From equation (11).

$$G = t_E exp[-E_a/R(1/T_E - 1/T_{Ref})] \quad (16)$$

and hence $$Ln(G) = Ln(t_E) - E_a/R(1/T_E - 1/T_{Ref}) \quad (17)$$

where $T_{Ref}$ is a reference temperature in the temperature range of the process (see block 63).

By using a weighted least squares linear regression method, the Equivalent Point ($t_E$, $T_E$) can now be determined (block 63). The weighting factor w is set equal to $G^2$ to obtain the best fit (block 63). It should be noted, however, that this is but one of several techniques available to determine the value of the Equivalent Point ($t_E$, $T_E$).

Determination of the Time-Temperature Profile

Referring again to FIG. 11, block 53, the product constituent relationship G can be expressed as $$G = \int_0^{t_f} exp[(-E_a/R)(1/T(t) - 1/T_{Ref})]dt \quad (18)$$

Figure 12C:
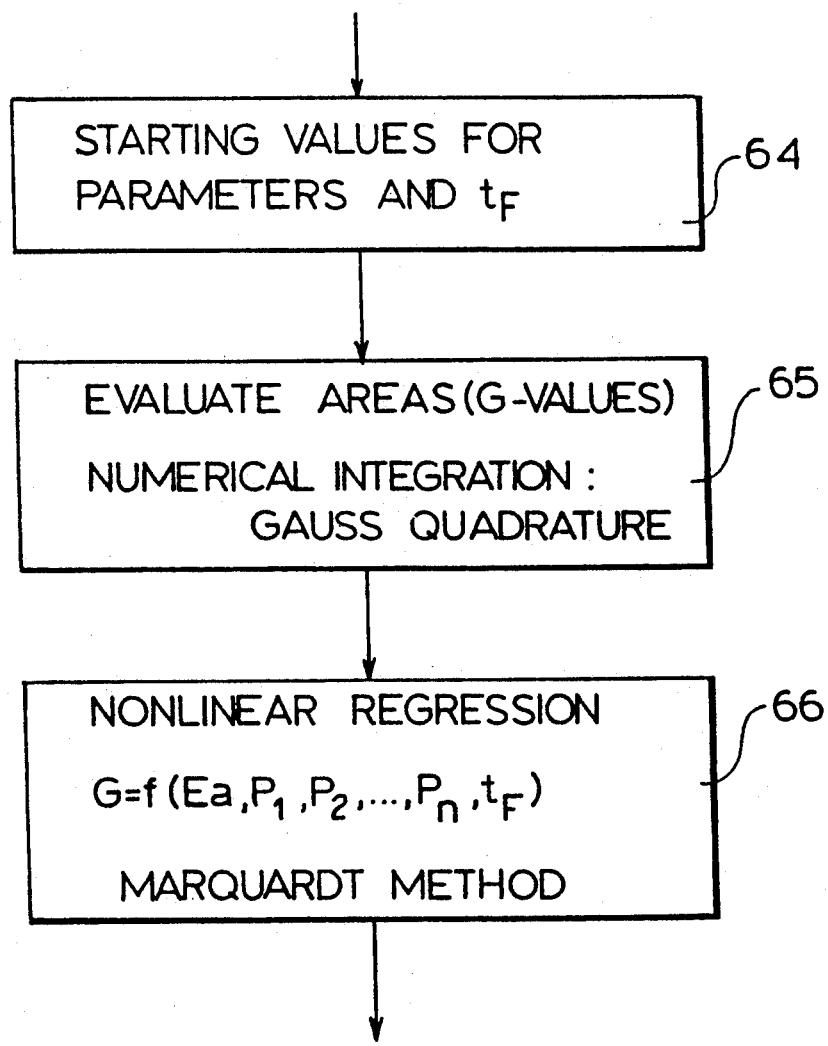

The expression inside the integral is evaluated numerically using a procedure such as Gauss Quadrature (see blocks 64, 65 of FIG. 12C). This yields a function in terms of the parameters $P_1, P_2, \ldots P_n$, which characterize the exact curve, and $t_f$ the residence time of the particle. A non-linear regression method such as the Marquardt method can now be used to optimize the parameters, using the table of G versus $E_a$ values obtained above. Details of the procedure and a sample problem with its output are presented below.

Referring now to block 64 (FIG. 12), initial values for the following parameters are introduced: (a) parameters corresponding to the suggested time-temperature function Temp(time) and (b) initial estimate of the residence time, $t_f$. This is an important step to any technique used for the nonlinear regression; therefore, an educated guess for the parameters is used.

Referring now to block 65, the G-values are evaluated by numerical integration. In principle, any numerical integration routine can be used; however, Gauss Quadrature and Romberg integration routines require less computational effort than other routines like Simpson rule, trapezoidal rule, etc. In addition, if further accuracy is required, then the Adaptive Gauss Quadrature can be used. See Forsythe, G. et al., "Computer Methods for Mathematical Computations" (Prentice problem of finding the parameters for the suggested time-temperature profile follows a modular structure such that any nonlinear regression routine can be used with the time-temperature profile. The segment of code below is written in Pascal and can easily be translated to any other language such as FORTRAN, FORTRAN 77, BASIC C, etc.

```
Function Temp(Var time : Extended; Var a : glnparam) : Extended;
begin
        Temp:=273.16 + a[1] - (a[1]-100.0)*exp(-a[2]*time)
end;
Function Arrhenius(time: extended) : Extended;
{---------------------------------------------------------------------------------}
{-                     This is the function to integrate                        -}
{---------------------------------------------------------------------------------}
begin
        Arrhenius:= exp( - (Ea/8.314)*(1/Temp(time,a) -1/(273.16+121.11) ));
end;
Function Integral(lowerlimit, upperlimit, Ea : extended;
                            w, z : Intpoints; var a : glnparam): extended;
VAR
    j: integer;
    xr,xm,dx, area: extended;
     tempincreased:extended ;
     tempdecreased:extended ;
BEGIN
    area:=0.0;
    integral :=0.0;
     xm := 0.5*(upperlimit+lowerlimit);
     xr := 0.5*(upperlimit-lowerlimit);
     area := 0;
  FORj:= 1 to 5 DO BEGIN
     dx := xr*z[j];
         tempincreased:=xm+dx ;
         tempdecreased:=xm-dx ;
         area := area +w[j]*(
                 exp( - (Ea/8.314)*(1/Temp(tempincreased,a)-1/(273.16+121.11) ))+
                 exp( - (Ea/8.314)*(1/Temp(tempdecreased,a)-1/(273.16+121.11) )))
     END;
         integral := xr*area
END;
Procedure Funcs(x : extended; VAR a : glnparam; VAR y: extended;
                   VAR dyda : glnparam; na : integer);
BEGIN
  Ea:=x;
     y:= integral(lowerlimit, upperlimit, Ea, w, z, a);
     dyda[1] := Derivative of y, w.r.t. a[1];
     dyda[2] := Derivative of y, w.r.t. a[2];
     dyda[3] := Derivative of y, w.r.t. a[3];
END;
```

Hall, New Jersey, 1977).

Referring now to block 66, the functions required to implement the nonlinear regression will be described. First, Function Temp is the only part of the following program that has to be changed to introduce any time-temperature profile including any number of parameters. However, in addition to empirical models, those models based upon transport phenomena and physics may be appropriate resulting in parameters related to physico-chemical properties. Second, Function Arrhenius introduces the typical exponential transformation for the temperature (Temp) where the activation energy (Ea) is a parameter. Third, Function Integral evaluates G-values using a 10-point Gauss Quadrature procedure. This function can be easily modified to adjust for complicated time-temperature profiles, for example using an Adaptive Gauss Quadrature routine, see Forsythe et al., 1977; also see Stoer, J. and Burlirsch, R., "Introduction to Numerical Analysis" (Springer-Verlag, 1980). Fourth, Procedure Funcs evaluates the model and its derivatives with respect to all the parameters for any call of the nonlinear routine. Derivatives are evaluated numerically in order to simplify the implementation of any time-temperature profile. The Still referring to block 66, there are many methods that can be used to perform a nonlinear regression, among them: the Marquardt Method, see Marquardt, D., J. Soc Ind. Appl. Math 11, 431 (1963); the Quasi-Newton Methods, see Dennis, Jr., J. and Schnabel, R., "Numerical Methods for Unconstrained Optimization and Nonlinear Equations" (Prentice Hall Seris in Computational Mathematics, New Jersey, 1983). Marquardt introduced an elegant and practical method which is related to an earlier suggested of Levenberg; consequently, this method is also referred to as the Levenberg-Marquardt method. The Marquardt Method works very well in practice and has become one of the most used procedure for nonlinear least-squares routines. In addition, this method is simple to be implemented in most personal computers.

To illustrate the processing steps according to the invention, an indirect continuous flow heat exchanger with an exponential time-temperature profile is examined. For this system the initial temperature was 100° C., the steam temperature was 150° C., the time constant was 1/0.23 s, and the residence time was 10 s.

Next, G-values for different activation energies were evaluated by numerical integration. Then, this data set (G versus Ea) was introduced into the nonlinear regression program using the Marquardt method and convergence was achieved in only eight iterations. Thus, the changes required to run an application and the output from the program can be summarized as follows:

Find T(t) Given Ea's and G's: Exponential Heating

---

Simulated exponential heating curve:
   Temp := 273.16 + 150 − (150−100.0)*exp(−0.23*time)
with a holding time (residence time ) tF= 10.0 s.
The main program should be modified as follows:
function Temp(Var time : Extended; Var a:glnparam) : Extended;
begin
   Temp := 273.16 + a[3] − (a[3]−100.0)*exp(−a[2]*time)
end;
The following data set obtained by numerical integration is used to simulate the interpolated data coming from the thermal memory cell. For purposes of this data set, assume that the G-values have been calculated, for example from Equation (8), with $E_a$ values corresponding to the individual metal diffusion constants for the Thermal Memory Cell.

| Ea (J/mol) | G-values |
|---|---|
| 60000.0 | 17.16874306 |
| 80000.0 | 21.52085063 |
| 100000.0 | 27.39976668 |
| 120000.0 | 35.32125815 |
| 140000.0 | 45.99054942 |
| 160000.0 | 60.37124572 |
| 180000.0 | 79.78023037 |
| 200000.0 | 106.01831583 |
| 220000.0 | 141.55017704 |
| 240000.0 | 189.75228380 |
| 260000.0 | 255.25473527 |
| 280000.0 | 344.41286045 |
| 300000.0 | 465.95826153 |
| 320000.0 | 631.89814160 |
| 340000.0 | 858.75835996 |

Note that a[1] refers to the residence time tF. -
Initial guess:
   a[1] = 15.00, a[2] = 0.1800 a[3] = 160.00
Program Output:

| a[1] | a[2] | a[2] |
|---|---|---|
| 9.56038896 | 0.16922873 | 163.82553616 |
| 9.70289879 | 0.14390359 | 163.81600529 |
| 10.48834362 | 0.16516461 | 154.26434102 |
| 10.48834362 | 0.16516461 | 154.26434102 |
| 10.08172057 | 0.21044761 | 150.30267775 |
| 10.03090245 | 0.22105695 | 150.70291735 |
| 10.00111093 | 0.22965782 | 149.99467428 |
| 10.00002182 | 0.22999389 | 150.00044498 |

The final result are :
a[ 1] = 10.000
a[ 2] = 0.2299
a[ 3] = 150.00

---

Determination of Residence Time Distribution

The residence time of a single particle is known from the procedure described above. The residence time distribution (RTD) of particles through a system can be measured by extending the same procedure for a system containing particulates, some or all of which contain a thermal memory cell (TMC) in the center. A complete RTD would then be available from the data.

Calculation of Film Side Heat Transfer Coefficient, h

If the thermal properties of the particle are known, the Fourier Modulus $$F_0^* = \alpha t/R^2 \tag{19}$$

can be calculated. Here $\alpha$ is thermal diffusivity, t is time and R is particle radius. From the charts of Heisler, M. *Trans. ASME* 69, 227 (1947), and Pitts, D. and Sissom, L., "Theory and Problems of Heat Transfer" (Schaum's Outline Series in Engineering, McGraw-Hill Book Company, 1977), the Biot number $$Bi^* = hR/k \tag{20}$$

is known, where h is heat transfer coefficient and k is thermal conductivity.

It should be noted that the particle center temperature, its initial temperature, and the bulk fluid temperature are known. The only unknown in equation (20) is then the heat transfer coefficient, h, which can now be determined. In addition, by using the correction chart for a solid sphere, see Heisler, M. (1947), the temperature of the particle surface can also be computed.

Now, if a second TMC is attached to the surface of the particle, the surface temperature can be calculated by using the same procedure described above to determine the temperature profile. This measurement can be then used to confirm/verify the accuracy of the method used to determine the heat transfer coefficient, h.

The preceding sections discuss some of the key properties and parameters that can be determined by the EPM. As mentioned before, the EPM can also be used to evaluate several thermodynamic properties. In addition, it can be used to predict constituent kinetics in microenvironments and fouling dynamics of heat exchangers.

In an alternative embodiment of the present invention, 20% sucrose solution acidified with sulfuric acid to pH 2.5, and blue #2 solution buffered with sodium carbonate to pH 11.3 are used as thermal constituents and encapsulated in ¼" O.D. cylindrical aluminum modules. The ends of the modules are sealed with silicon sealant (heat resistant and stable up to 400° C.). The thermal constituents are place dint eh modules with a hypodermic syringe. The two modules containing different thermal constituents are placed at the center of cans filled with sweet potato and water and the cans sealed. The can are thermally treated at between 110°–125° C. (230°–256° F.) in a batch retort. After heating, the cans are cooled by tap water and the solutions inside the modules recovered and diluted to 1 milliliter. Constituent changes occurring in each individual module is assayed and the equivalent point for the thermal treatment calculated by essentially the same procedures s described above.

The foregoing is illustrative of the present invention, and is not to be taken as restrictive thereof. The invention is defined by the following claims, with equivalents of the claims to be included therein.

That which is claimed is:

1. A method for determining a thermal history of an object, said method comprising:
   (a) coupling to said object, at least two thermal calibration materials having different activation energies; then
   (b) exposing said object to a thermal treatment; then
   (c) detecting the change in each of said calibration materials caused by said thermal treatment; and then
   (d) calculation an equivalent point of said thermal treatment from said detected changes.

2. The method of claim 1 wherein said calculating step comprises the steps of:
   determining a product constituent relationship for each of said calibration materials having different activation energies based upon the detected changes in each of said calibration materials caused by said thermal treatment, to thereby obtain a product constituent relationship for each of said calibration materials having different activation energies;
   interpolating the obtained product constituent relationships and the activation energies for each of said calibration materials to obtain a range of product constituent relationships versus activation energy; and
   obtaining the equivalent point of said thermal treatment from the interpolated range of product constituent relationships versus activation energy.

3. The method of claim 2 wherein said determining step comprises the steps of:
   determining the relative shift in each of said calibration materials caused by said thermal treatment; and
   dividing the relative shift by a preexponential factor.

4. The method of claim 2 when the step of obtaining the equivalent point comprises the step of:
   applying a weighted least squares regression to the interpolated range of product constituent relationships versus activation energy.

5. A method for determining a thermal history of an object, said method comprising:
   (a) coupling to said object, at least two thermal calibration materials having different activation energies; then
   (b) exposing sad object to a thermal treatment; then
   (c) detecting the change in each of said calibration materials caused by said thermal treatment; and then
   (d) calculating a time-temperature profile of said thermal treatment from said detected changes.

6. The method of claim 5 wherein said calculating step comprises the steps of:
   determining a product constituent relationship for each of said calibration materials having different activation energies based upon the detected changes in each of said calibration materials caused by said thermal treatment, to thereby obtain a product constituent relationship for each of said calibration materials having different activation energies;
   performing a numerical integration on the product constituent relationship for each of said calibration materials.

7. A method for determining a thermal history of an object, said method comprising:
   (a) coupling to said object, at least two thermal calibration materials having different activation energies; then
   (b) exposing said object to a thermal treatment; then
   (c) detecting the change in each of said calibration materials caused by said thermal treatment; and then
   (d) calculating the thermal history of said thermal treatment from said detected changes.

8. A method for determining a thermal history of an object comprising the steps of:
   (a) coupling to said object a capacitor, having a semiconductor substrate and an insulating layer between a pair of contacts, the insulating layer being doped with mobile changed carriers;
   (b) measuring the capacitance of said capacitor across the pair of contacts;
   (c) exposing said object to a thermal treatment;
   (d) measuring the capacitance of said capacitor across the pair of contacts, after said thermal treatment; and
   (e) determining the thermal history of said object based upon the ensured change in capacitance of said capacitor from said thermal treatment.

9. A method for determining a thermal history of an object comprising the steps of:
   (a) placing in said object a plurality of capacitors, each having a semiconductor substrate and an insulating layer between a pair of contacts, the insulating layer of each of said capacitors being doped with mobile charged carriers having different activation energies;
   (b) measuring the capacitance of each of said plurality of capacitors across the pair of contacts;
   (c) exposing said object to a thermal treatment;
   (d) measuring the capacitance of each of said capacitors across each pair of contacts after said thermal treatment; and
   (e) determining the thermal history of said object based upon the measured changes in capacitance of said plurality of capacitors from said thermal treatment.

10. A capacitor useful as a thermal history recording device, comprising:
   a semiconductor substrate;
   na insulating layer on said semiconductor substrate, said insulating layer being non-uniformly doped with mobile charged carriers; and
   a conductive layer on said insulating layer, said mobile charged carriers being concentrated at the interface of said insulating layer and said conductive layer.

11. A capacitor useful as a thermal history recording device, comprising:
   a semiconductor substrate;
   an insulating layer on said semiconductor substrate, said insulating layer being non-uniformly doped with mobile charged carriers; and
   a conductive layer on said insulating layer said mobile charged carriers being concentrated at the interface of said insulating layer and said semiconductor substrate.

12. A calibration device for determining a thermal treatment provided by a thermal processing apparatus, comprising:
   an object; and
   a capacitor coupled to said object, said capacitor comprising:
   a semiconductor substrate;
   an insulating layer on said semiconductor substrate, said insulating layer being doped with mobile charged carriers; and
   a conductive layer on said insulating layer.

13. A thermal memory cell for thermal system evaluation, comprising:
   (a) a support structure;
   (b) a first thermal calibration material comprising a first conductor-insulator-semiconductor capacitor, connected to said support structure, for detecting a thermal treatment; and
   (c) a second thermal calibration material comprising a second conductor-insulator-semiconductor capacitor, connected to said support structure, for detecting a thermal treatment; said first calibration material having an activation energy different from said second calibration material.

14. The thermal memory cell as claimed in claim 13 wherein said first and second capacitors provide graded responses to said thermal treatment.

15. The thermal memory cell as claimed in claim 13 wherein each of said capacitors includes a semiconductor substrate, an insulating layer, on the substrate and a conductive layer on the insulating layer, th insulating layer of each of said capacitors being doped with a charged ion, and wherein each capacitor is doped with a charged ion different from the other.

16. The thermal memory cell as claimed in claim 15 wherein said charged ion dopant of each of said capacitors is collected at the conductor/insulator interface of said capacitor.

17. The thermal memory cell as claimed in claim 15 wherein said charged ion dopant of each of said capacitors is collected at the semiconductor/insulator interface of said capacitor.

18. The thermal memory cell as claimed in claim 13 wherein sd first and second capacitors function as time/temperature integrators having different activation energies.

19. An apparatus for determining a thermal history of a thermal memory cell exposed to a thermal treatment, said thermal memory cell carrying at least two capacitors having different activation energies, said apparatus comprising:
   (a) means for holding said memory cell;
   (b) sensing means for detecting changes in the capacitance of each of said capacitors caused by said thermal treatment; and
   (c) calculating means responsive to said sensing means for calculating the thermal history of said thermal treatment from said detected changes.

20. The apparatus of claim 19 wherein said calculating means comprises means for calculating an equivalent point of said thermal treatment from said detected changes.

21. The apparatus of claim 19 wherein said calculating means comprises:
   means for determining a product constituent relationship for each of said capacitors having different activation energies, based upon the detected changes in the capacitance of said capacitors caused by said thermal treatment to thereby obtain a product constituent relationship for each of said capacitors having different activation energies;
   means for interpolating the obtained product constituent relationships and the activation energies for each of said capacitors to obtain a range of product constituent relationships versus activation energy; and
   means for obtaining the equivalent point of said thermal treatment for the interpolated range of product constituent relationships versus activation energy.

22. The apparatus of claim 21 wherein said means for determining comprises:
   means for determining the relative shift in the capacitance of each of said capacitors caused by said thermal treatment; and
   means for dividing the relative shift by a preexponential factor.

23. The apparatus of claim 21 wherein said means for obtaining the equivalent point comprises:
   means for applying a weighted least squares regression to the interpolate range of product constituent relationships versus activation energy.

24. The apparatus of claim 19 wherein said calculating means comprises means for calculating a time-temperature profile of said thermal treatment from said detected changes.

25. The apparatus of claim 24 wherein said calculating means comprises:
   means for determining the product constituent relationship for each of said calibration materials based upon the detected changes in each of said calibration materials caused by said thermal treatment; and
   means for performing a numerical integration on the product constituent relationship for each of said calibration materials.

* * * * *

UNITED STATES PATENT AND TRADEMARK OFFICE
CERTIFICATE OF CORRECTION

PATENT NO. : 5,159,564

DATED : October 27, 1992

INVENTOR(S) : Swartzel, et al

Page 1 of 4

It is certified that error appears in the above-indentified patent and that said Letters Patent is hereby corrected as shown below:

Column 3, line 3, "FIG." should be --FIGS.--

Column 5, line 9, "ACCU-STRIPTM" should be --ACCU-STRIP™--

Column 5, line 23, "ACCUS-" should be --ACCU- --.

Column 5, line 24, "TRIPTM" should be --STRIP™--.

Column 6, line 17, "Na" should be --Na+--.

Column 6, line 54, "Na-" should be --Na+--.

Column 10, line 11, "/LI)" should be --(LI)--.

Column 11, line 5, "now" should be --not--.

Column 11, line 65, $$M_1 = Ln((VC)_o / (CV)_f) \qquad (13)$$

should be $$M = Ln((VC)_o / (CV)_f) \qquad (13)$$

UNITED STATES PATENT AND TRADEMARK OFFICE
CERTIFICATE OF CORRECTION

PATENT NO. : 5,159,564
DATED : October 27, 1992
INVENTOR(S) : Swartzel et al.

It is certified that error appears in the above-identified patent and that said Letters Patent is hereby corrected as shown below:

Column 12, line 10, equation should be centered.

Column 12, line 18, "Ea" should be --$E_I$--.

Column 12, line 19, "$E_I$" should be --$E_a$--.

Column 12, line 47, $$G=\int_0^{tf} \exp[(-Ea/R)(1/T(t)-1/T_{Ref})]\,dt \qquad (18)$$

should be $$-- G=\int^{t}f \exp[(-E_a/R)(1/T(t)-1/T_{Ref})]\,dt -- \qquad (18)$$

Column 14, line 53, "Seris" should be --Series--.

Column 15, line 65, $$F_O^*=at/R^2 \qquad (19)$$

UNITED STATES PATENT AND TRADEMARK OFFICE
CERTIFICATE OF CORRECTION

PATENT NO. : 5,159,564            Page 3 of 4
DATED : October 27, 1992
INVENTOR(S) : Swartzel et al.

It is certified that error appears in the above-identified patent and that said Letters Patent is hereby corrected as shown below:

should be $$F_o^* = \alpha \ t/R^2 \qquad (19)$$

Column 17, line 12, "place dint eh" should be --placed in the--.

Column 17, line 16, "can" should be --cans--.

Column 17, line 23, "s" should be --as--.

Column 17, line 38, "calculation" should be --calculating--.

Column 18, line 6, "sad" should be --said--.

Column 18, line 49, "ensured" should be --measured--.

Column 19, line 4, "na" should be --an--.

Column 19, line 17, after "insulating layer" should be --insulating layer,--.

Column 19, line 53, "th" should be --the--.

Column 20, line 2, "sd" should be --said--.

UNITED STATES PATENT AND TRADEMARK OFFICE
CERTIFICATE OF CORRECTION

PATENT NO. : 5,159,564
DATED : October 27, 1992
INVENTOR(S) : Swartzel et al.

It is certified that error appears in the above-identified patent and that said Letters Patent is hereby corrected as shown below:

Column 20, line 36, "for" should be --from--.

Column 20, line 48, "interpolate" should be --interpolated--.

Signed and Sealed this

Twenty-eighth Day of December, 1993

BRUCE LEHMAN

Attest:

*Attesting Officer*  *Commissioner of Patents and Trademarks*